United States Patent [19]
Amano et al.

[11] Patent Number: 4,803,116
[45] Date of Patent: Feb. 7, 1989

[54] WATERPROOF FABRIC HAVING HIGH MOISTURE PERMEABILITY AND METHOD OF MAKING SAME

[75] Inventors: Jiro Amano, Takatsuki; Masato Shimada, Ohtsu; Kouzou Takano; Shunroku Tohyama, both of Shiga, all of Japan

[73] Assignee: Toray Industries Incorporated, Tokyo, Japan

[21] Appl. No.: 925,709

[22] Filed: Oct. 30, 1986

[30] Foreign Application Priority Data

Oct. 31, 1985 [JP] Japan ................................. 60-242960
Mar. 4, 1986 [JP] Japan ................................. 61-45328
May 19, 1986 [JP] Japan ................................. 61-112773

[51] Int. Cl.⁴ ............................................. B32B 27/00
[52] U.S. Cl. .................................... 428/286; 427/246; 427/342; 428/245; 428/265; 428/267; 428/287; 428/290; 428/315.5; 428/315.9; 428/423.1; 428/913

[58] Field of Search ............... 428/315.5, 315.7, 315.9, 428/290, 913, 423.1, 245, 265, 267, 286, 287; 427/246, 342

[56] References Cited

U.S. PATENT DOCUMENTS 4,560,611 12/1985 Nako et al. ....................... 428/315.9

FOREIGN PATENT DOCUMENTS

0151952 11/1981 Fed. Rep. of Germany ... 428/315.9
6604404 10/1966 Netherlands ..................... 428/315.9

Primary Examiner—James J. Bell
Attorney, Agent, or Firm—Scully, Scott, Murphy & Presser

[57] ABSTRACT

A waterproof fabric having a high moisture permeability and having an ultra-microporous continuous polymer coating having an average pore diameter in the range of between 50 Å and 0.2μ, said polymer having a monomer unit containing at least one acid radical selected from carboxyl group, sulfonic acid group, and alkali metal salts thereof.

22 Claims, 2 Drawing Sheets

WATERPROOF FABRIC HAVING HIGH MOISTURE PERMEABILITY AND METHOD OF MAKING SAME

BACKGROUND OF THE INVENTION

The present invention relates to a waterproof fabric having a high moisture permeability. Particularly, it is concerned with a novel waterproof fabric having a high moisture permeability and permitting a quick permeation therethrough of not only gaseous sweat caused by insensible perspiration but also liquid sweat caused by sensible perspiration.

Heretofore, various fabrics have been known as moisture-permeable waterproof fabrics, such as urethane wet-coated fabric and fabric with a microporous film of polytetrafluoroethylene laminated thereto. However, since these moisture-permeable waterproof fabrics are of a hydrophobic microporous structure (average pore diameter: larger than $0.2\mu$), inside moisture can permeate the fabrics only in the form of vapor. Therefore, although insensible perspiration (gaseous sweat) caused by a light exercise is allowed to permeate the fabrics, sensible perspiration (liquid sweat) cannot pass through the fabrics due to the hydrophobicity and waterproofness of the fabrics. Additionally, the pore diameter is so large that when a hydrophilic materials such as dirt from the hands or any other hydrophilic dirt is deposited on the pore interior after repeated use, the water resistance deteriorates markedly.

On the other hand, there has also been made an attempt to incorporate a hydrophilic material such as a polymer having a high water absorbability into a coating resin layer with a view to allowing liquid sweat to escape to the exterior In this case, inside moisture is merely absorbed by the polymer having a high water absorbability and does not escape to the exterior, resulting in increased weight of clothes. A further drawback is the occurrence of dropping out due to swelling of the highly water-absorbable polymer. It has also been tried to introduce a long polyol chain into the polymer molecular chain to thereby impart a hydrophilic nature to the polymer. But it is the present situation that the water absorbing performance is insufficient and the moisture permeability is low. Thus a material which permits the permeation therethrough of sensible perspiration and yet has water resistance, has not been obtained yet.

SUMMARY OF THE INVENTION

It is the object of the present invention to provide a waterproof fabric having a high moisture-permeability and superior in the function of allowing both insensible and sensible perspirations to escape therethrough quickly.

The waterproof fabric having a high moisture-permeability of the present invention has an ultramicroporous, continuous, synthetic resin coating having an average pore diameter in the range of between 50 Å and $0.2\mu$, said synthetic resin containing a monomer unit having at least one acid radical selected from carboxyl group, sulfoxyl group, and alkali metal salts thereof.

DETAILED DESCRIPTION OF THE INVENTION

The ultra-microporous continuous resin or polymer coating referred to herein represents a resin coating which is continuous in a planar direction of fabric and homogeneous in a coating thickness direction and which has a thickness usually not smaller than $2\mu$, preferably not smaller than $5\mu$. It is necessary that an average diameter of ultra-fine pores be in the range of between 50 Å and $0.2\mu$. In the present invention, the resin composition has a hydrophilic nature, so the presence of a pore larger than $0.2\mu$, would cause leakage of water due to capillarity, resulting in that the actual waterproofness becomes unsatisfactory even if a high water resistance is obtained. Therefore, a maximum pore diameter cannot exceed $0.2\mu$. More particularly, it is necessary that there be present no pore capable of being confirmed substantially by an electron microscope having a magnification of 4000×. In the case of an average pore diameter smaller than 50 Å, the moisture permeability will be unsatisfactory because water molecules which have been absorbed as moisture or water by the hydrophilic resin coating, or an aggregate thereof, becomes lower in the speed of diffusion through the coating. The "average pore diameter" referred to herein has been obtained from a pore distribution as measured by a mercury press-in method. It is a volume average pore diameter. For attaining higher waterproofness and moisture permeability, it is preferable that the average pore diameter be in the range of between 50 Å and $0.1\mu$, more preferably between 80 Å and $0.05\mu$.

Figure 1:
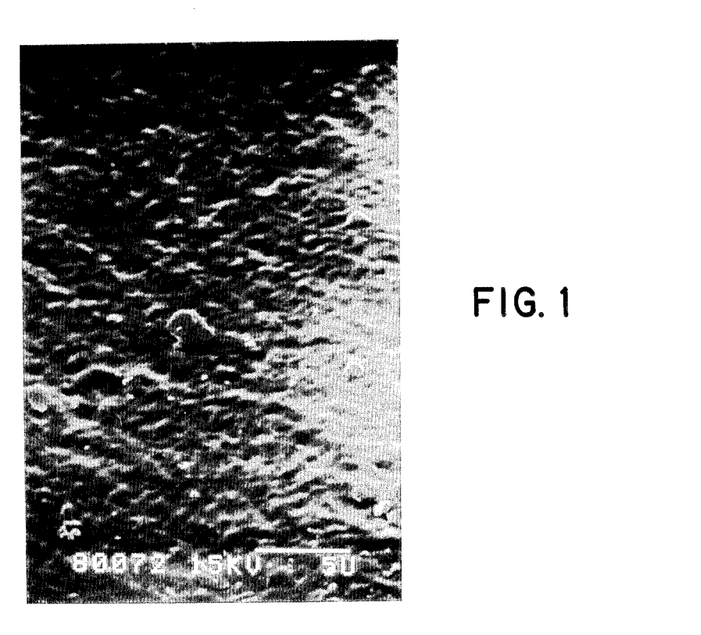
FIGS. 1 and 2 are photographs, enlarged by an electron microscope, of the surface and section respectively of an ultra-microporous continuous polymer coating formed on nylon taffeta, FIG. 1 showing a surface portion of the coating (magnification 4000×) and FIG. 2 showing a section of the coating including that of the nylon taffeta (magnification 1200×)
Figure 2:
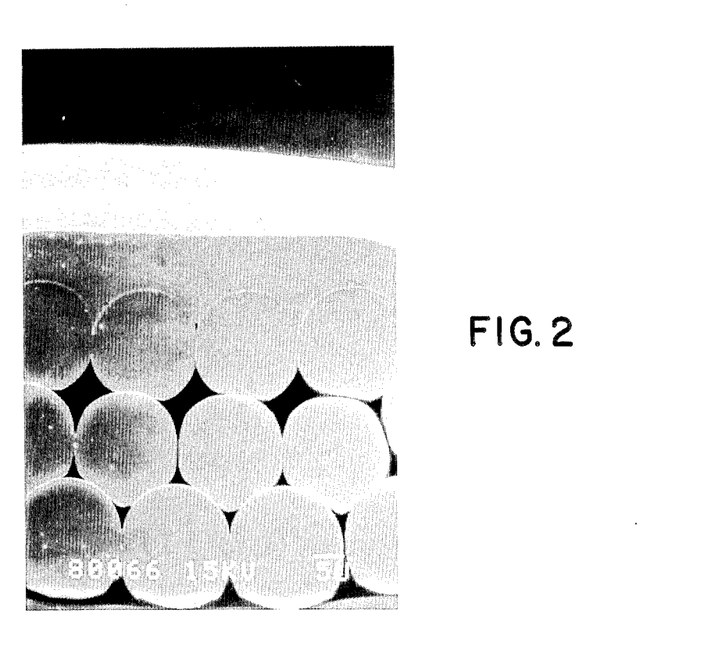
Figure 3:
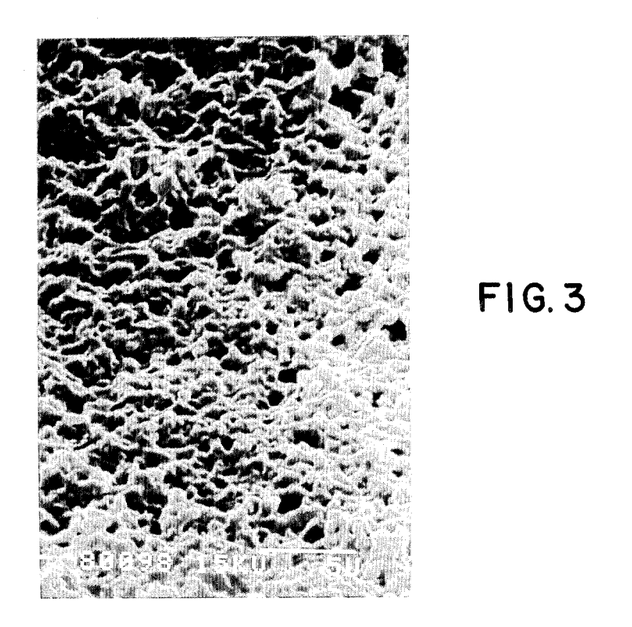
FIGS. 3 and 4 are enlarged photographs of the surface and section respectively of Comparative Example 1, FIG. 3 showing a surface portion of the coating (magnification 4000×) and FIG. 4 showing a section of the coating including that of nylon taffeta (magnification 1200×).
Figure 4:
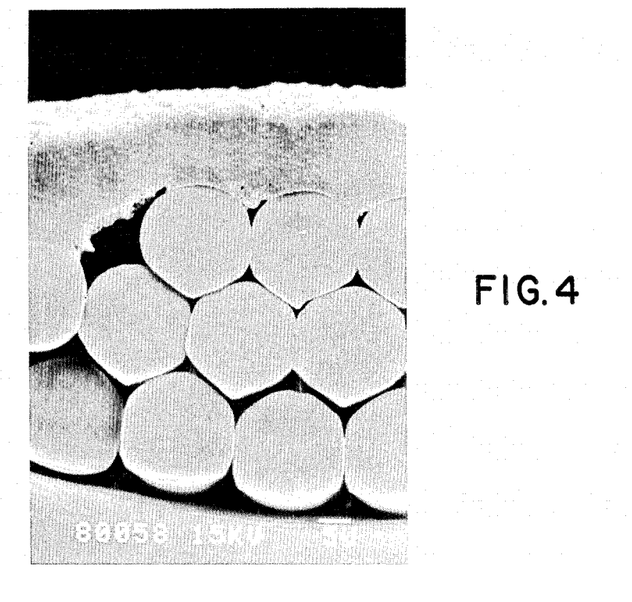

In the drawing, FIG. 1 is a photograph of the surface of an ultra-microporous continuous polymer coating according to the present invention, enlarged to 4000× by an electron microscope, from which it is seen that there are no appreciable pores. This coating was found to have an average pore diameter of 80 Å, and a high moisture permeability was attained due to the introduction of hydrophilic end groups. On the other hand, FIG. 3 is a photograph of the surface of a polymer coating with no acid radical introduced therein, enlarged to 4000×, as a comparative example, in which there are appreciable pores. Despite of a large average pore diameter of 1500 Å, the moisture permeability is not high because the polymer coating is hydrophobic. Besides, the large pore diameter prevents the attainment of a satisfactory waterproofness.

The fabric used as a base material in the present invention is a sheet-like material comprising a synthetic fiber such as polyamide, polyester or polyacryl, an improved fiber thereof, a natural fiber such as wool, silk, cotton or hemp, a semi-synthetic fiber such as acetate or rayon, or a mixed fiber thereof. Examples are woven, knitted and non-woven fabrics, which may be subjected to a water repelling treatment for the purpose of controlling the permeation of the resin into the fabric.

It is necessary that the resin composition which constitutes the ultra-microporous resin coating in the present invention contain as a component thereof at least one acid radical selected from carboxyl group (—COOH), metal salts thereof (—COOM), sulfonic acid group (—SO$_3$H) and metal salts thereof (—SO$_3$M), in which M represents an alkali metal. Without such acid radical, water molecules cannot pass through the coating under moisture- and/or water-absorptive diffusion, merely passing through ultra-fine pores. In this case, a satisfactory moisture permeability is not obtained because of a too small pore diameter as compared with the pore diameters of conventional moisture-permeable waterproof fabrics.

It is preferable that such acid radical-containing monomer unit be present not less than 5 wt. %, more preferably not less than 9 wt. %, in the polymer and that the number of such acid radical per polymer molecule be at least two on the average. The presence of plural acid radicals on the same molecule is advantageous in that water molecules from moisture absorption and/or water absorption can be moved efficiently and so the speed of diffusion becomes higher, resulting in the moisture permeability being improved.

A polymer not having acid radical-containing monomer unit may be blended with the polymer having such monomer unit. But in this case, it is preferable that the proportion of the polymer having acid radical-containing monomer unit be not less than 30 wt. % of all the polymers. If the said proportion is smaller than 30 wt. %, the hydrophilic nature of the entire resin coating will become unsatisfactory, which may result in unsatisfactory moisture permeability based on moisture- and-/or water-absorptive diffusion.

The acid radical or radicals may be any of carboxyl group, sulfonic acid group, and alkali metal salts thereof. The alkali metal salts are preferred, among which sodium salt is particularly preferred.

In the pore diameter range of the ultra-microporous coating of the present invention in the case where the sodium ion concentration in the coating is high, an osmotic pressure acts between such sodium ion concentration and the sodium ion concentration of liquid sweat, to increase the speed of water absorption into the coating, resulting in that the moisture permeability is greatly improved. Thus, a higher moisture permeability is attained because there is obtained water absorbability based on such osmotic pressure in addition to the moisture- and water absorbability based on acid radical.

The polymer having acid radical-containing monomer unit can be derived from, for example, olefinic unsaturated carboxylic acids such as acrylic and methacrylic acids, aromatic dicarboxylic acids containing sulfonic acid group such as sulfoisophthalic acid and sulfoterephthalic acid, or acids containing plural carboxyl groups such as glutamic acid and aspartic acid. The acid radicals of these compounds may be used, for example, in the form of alkyl esters and finally converted to free acid radicals or salts thereof by hydrolysis. The polymer having acid radical-containing monomer unit is preferably an elastomeric polymer.

According to an example of the use of amino acid, a portion or the whole of γ-alkyl ester groups of a polymer containing γ-alkyl glutamate units is modified into carboxyl group and/or an alkali metal salt thereof, and a coating of this polymer is formed on a fabric. As examples of the γ-alkyl ester in the polymer containing γ-alkyl glutamate units, lower aliphatic alkyl esters such as methyl ester and ethyl ester are preferred. This is because hydrolysis takes place easily in the presence of alkali or acid and the resulting low molecular weight compounds are water-soluble. From the standpoint of a high moisture permeability, it is desirable to use a poly-γ-alkyl glutamate. But there may be used a polymer and/or a copolymer thereof with another polymer in order to reduce the cost, soften the texture, or improve the wet film forming property. In this case, for maintaining the moisture permeability at a high level, it is preferable that the content of the polymer containing γ-alkyl glutamate units be not less than 30 wt. % as previously noted. As preferred examples of other polymers to be blended or copolymerized with the poly-γ-alkyl glutamate there are mentioned linear high polymers such as polyurethanes, polyesters and polyethers. For improving the wet film formability and the texture, polyurethanes are preferred.

In the polymer molecules containing γ-alkyl glutamate units there are present γ-alkyl ester groups in a number corresponding to the number of repeating units of γ-alkyl glutamate, of which at least two per molecule on the average are preferably substituted with carboxyl group and/or an alkali metal salt thereof. The presence of plural such hydrophilic groups on the same molecule permits an efficient movement of water molecules after moisture absorption and/or water absorption, resulting in that the speed of diffusion becomes higher and hence the moisture permeability is improved.

According to a manufacturing example for a copolymer having γ-alkyl glutamate units, an isocyanateterminated urethane prepolymer and a γ-methyl-L-glutamate-N-carboxylic anhydride are subjected to polycondensation. The resulting polymer has an alkyl ester as acid radical.

The waterproof fabric having a high moisture permeability of the present invention is obtained by applying a solution of the polymer containing γ-alkyl glutamate units to a fabric and, after wet film formation, effecting modification in an alkaline or acid bath. Even if a coagulative film formation and modification are performed simultaneously in an alkaline or acid bath, there also is obtained the waterproof fabric of the present invention. Or the manufacturing process may comprise first adding an aqueous alkaline solution or acid solution to the polymer solution to effect modification and thereafter performing a dry or wet film formation.

The modification of poly-γ-alkyl glutamate is effected in a diluted aqueous solution of an inorganic acid or in an alkaline aqueous solution of a metal hydroxide for example. The inorganic acid referred to herein indicates a mineral acid such as, for example, hydrochloric, sulfuric or nitric acid, which is used as a diluted aqueous solution of 0.5 to 10N. A smaller concentration than 0.5N is inappropriate for use in the actual process because the speed of modification is low and hence the efficiency is poor. If the concentration is larger than 10N, the coating strength will become insufficient because there occurs hydrolysis of the polymer even in a short time. The metal hydroxide indicates a metal hydroxide which exhibits alkalinity in the form of an aqueous solution of, for example, sodium hydroxide, potassium hydroxide, or magnesium hydroxide. It is used as an aqueous solution having a concentration of 0.2 to 8N. Other alkaline aqueous solutions are also employable. A smaller concentration than 0.2N would result in poor efficiency of the modification, and if the concentration of the metal hydroxide is larger than 8N, the coating strength will become insufficient because of hydrolysis of the polymer. Thus, the decomposition of the main chain proceeds simultaneously with the modification, so ample care should be exercised about the temperature of the aqueous solution. It is difficult to set an allowable temperature to a certain constant value becase the reactivity differs depending on the concentration of the aqueous solution and on whether the aqueous solution is of acid or of alkali, but when the energy cost is also taken into account, it is preferable that the temperature be not higher than 60° C., more preferably 30° C. or thereabout. The modification may be effected in the resin solution, in the coagulation bath, or after the film formation.

In the polymer having γ-alkyl glutamate units used in the invention, as previously noted, it is preferable that the content of γ-alkyl glutamate units be not less than 30 wt. % and that the content of the said polymer be not less than 30 wt. % of the total polymer weight. Further, it is particularly preferable that the carboxyl group and/or an alkali metal salt thereof resulting from the above modification be present not less than two per molecule on the average.

According to another manufacturing example for the polymer having acid radical-containing monomer units, a polyester diol prepolymer is prepared in a known manner using a sulfonic acid group-containing dicarboxylic acid as an acid component, then this prepolymer is polycondensed with a diisocyanate component to prepare a polyurethane solution, and this solution is applied to a fabric, followed by dry or wet film formation.

As an example of the polyester diol prepolymer having a sulfonic acid group and/or an alkali salt thereof in the acid component there is mentioned a copolymer of a diol component such as ethylene glycol or polyethylene glycol and an acid component which is an aromatic dicarboxylic acid such as terephthalic acid and isophthalic acid having sulfonic acid groups and/or an alkali metal salt thereof in the molecule. Such polyester diol prepolymer having acid radical is polycondensed with an isocyanate component, together with a polyester diol prepolymer not having acid radical if necessary. Preferably, the content of such prepolymer is not less than 30 wt. %. Further, in the preparation of the polyester diol prepolymer having acid radical, it is preferable that the acid component having acid radical be used so that not less than two acid radicals on the average be introduced per molecule.

As the diisocyanate component, commonly-employed diisocyanates may be used directly such as aliphatic diisocyanates, e.g. hexamethylene diisocyanate, alicyclic diisocyanates, e.g. 4,4'-dicyclohexylmethane diisocyanate, and aromatic diisocyanates such as 4,4'-diphenylmethane diisocyanate.

According to a further manufacturing example for the polymer having acid radical-containing monomer units, a coating is prepared using a polymer not having acid radical (including the ester thereof) and thereafter acid radical is introduced by a graft polymerization. For example, a polyurethane resin-coated fabric obtained by a dry or wet film formation is graft-modified with a vinyl monomer having carboxyl group and/or the ester thereof, followed by alkali or acid treatment. As the polyurethane resin there may be used any of polyester and polyether resins usually employed in coating. It does not matter which of solvent system and water dispersion system is to be used.

Preferred examples of the vinyl monomer having carboxyl group and/or the ester thereof include acrylic acid monomers such as acrylic acid, methyl acrylate and ethyl acrylate, as well as methacrylic acid monomers such as methacrylic acid, methyl methacrylate and ethyl methacrylate. The graft-improved polyurethane resin-coated fabric is subjected to an alkali or acid treatment if necessary whereby there is made modification to carboxyl group and/or a salt thereof. Water molecules from moisture and/or water absorption must be diffused and escaped to the exterior of the system quickly in order to obtain a high moisture permeability. This can be attained by introducing hydrophilic end groups effectively. In this case, it is preferable that the content of the graft-improved polymer be not less than 30 wt. % of all the polymers. And it is particularly preferable that not less than two carboxyl groups and/or alkali metal salt groups thereof be introduced per molecule of the graftimproved polymer on the average.

The coating may be done according to a conventional dry, wet, or dry-wet method. A suitable method is adopted according to the kind of polymer, etc. As an example, according to a wet method, a polymer solution in an organic solvent is applied to a fabric, followed by immersion in a coagulation bath such as water. An acid or an alkali may be present in the coagulation bath to hydrolyze esterified acid radicals simultaneously with coagulation. After the film formation and modification are thus completed in a wet fashion, the fabric is washed with water and then dried to remove the water absorbed and retained therein. Means for the drying is not specially limited; there may be adopted Pin-Tenter drying, hot cylinder roll drying, or vacuum drying. But when the control of density of the base fabric and the productivity are considered, Pin-Tenter drying is preferred. The drying temperature is not specially limited, either, if only water evaporates and the fabric is dried. But the range of 100° to 120° C. is preferred in consideration of the drying efficiency and the productivity.

After drying, the fabric is heat treated or hot pressed at a temperature not lower than 130° C. to thereby improve the adhesion between the resin film and the fabric. The heat treatment and/or hot pressing may be carried out by a hot air heating using Pin-Tenter or the like, or a direct heating using infrared ray or microwave, or a contact heating using a hot cylinder roll or the like, with Pin-Tenter heating being particularly preferred. If pressure is applied to the surface of the fabric during heating, the adhesion between the fabric and the resin film will be further improved. The method for this pressurizing treatment is not specially limited if only the fabric and the resin film are pressed strongly upon heating. But the use of a hot calender is preferred. A higher heating temperature is preferred provided it is not lower than 130° C. But when the melting and decomposition of the resin film and the fabric are considered, the heating temperature is preferably lower than 190° C. The heating time is preferably in the range of 10 to 180 seconds.

The method of coating the fabric with the resin is not specially limited. For example, there may be adopted a coating method using a floating knife coater, a knife-over-roll coater, a reverse roll coater, a roll doctor coater, a gravure roll coater, a kiss roll coater, or a nip roll coater, or a spraying method, a laminating method, or a bonding method.

The thus-obtained waterproof fabric having a high moisture permeability of the present invention may be subjected to a post water repelling treatment if necessary with a view to improving the waterproofness. No special limitation is placed on what kind of a water repellent is to be used and how to use it. A conventional water repellent such as, for example, an aqueous dispersion or solvent dispersion of a silicone-based water repellent and/or a fluorine-based water repellent may be used directly. Also as to its application method, there may be used a conventional method such as dipping method, one-side application method using a floating knife, or a spraying method. Particularly preferred is a one-side application method using a floating knife onto the base fabric surface which method permits a maximum utilization of the hydrophilic property of the resin coating.

The waterproof fabric of the present invention has a moisture permeability $M_1$ not lower than 4000 g/m$^2$·24 hr as measured according to the method defined by ASTM-E96-66B. This method measures the amount of steam passing through the fabric and it is related to the permeability of gaseous sweat caused by insensible perspiration. If the moisture permeability $M_1$ is smaller than 4000 g/m$^2$·24 hr, the permeation of gaseous sweat caused by insensible perspiration will become insufficient and the resulting increase in the interior humidity will accelerate a sensible perspiration, thus causing uncomfortableness.

The difference between a moisture permeability $M_2$ as measured according to the method defined by ASTM-E96-66BW and the moisture permeability $M_1$, i.e. $M_2-M_1$, is not smaller than 4000 g/m$^2$·24 hr. According to this measuring method, water is contacted with the resin surface on the fabric to determine the sum total of the amount of steam passing through the fabric and that of permeation of water based on the mechanism of water absorption into fabric-diffusion-release of moisture. Therefore, the larger the value of $M_2-M_1$, the greater the contribution of water permeability. This difference is scarcely recognized in conventional moisture-permeable waterproof fabrics having a hydrophobic microporous film structure, in which liquid sweat remains in clothes unless gaseous sweat in the clothes permeates fully and the interior humidity of the clothes becomes lower than 100% RH. If the value of $M_2-M_1$ is smaller than 4000 g/m$^2$·24 hr, there will not be obtained a comfortable feeling because of an unsatisfactory function of discharging liquid sweat. For enhancing the comfortableness, it is preferable that the $M_2-M_1$ value be not smaller than 8000 g/m$^2$·24 hr, more preferably not smaller than 10,000 g/m$^2$·24 hr. Generally, people apt to consider that liquid perspiration is prevented if a high steam permeability is imparted to clothes for lowering the interior humidity. However, when people take heavy exercise or when the temperature is high, a mere insensible perspiration does not suffice for the adjustment of bodily temperature and liquid sweat oozes out as sensible perspiration, as will be seen from the case of taking exercise without wearing clothes. Therefore, no matter how high in moisture permeability clothes may be, the clothes cannot be a really comfortable clothes unless it has the function of discharging water as liquid sweat to the exterior of the clothes.

In the present invention, steam permeability and liquid water permeability are combined whereby not only the discharge of gaseous sweat caused by insensible perspiration but also that of liquid sweat induced by sensible perspiration which has heretofore been ignored, is made possible. Further, by introducing specific hydrophilic groups into the molecular chain of the resin polymer, it is possible to prevent dropping-out of the polymer.

The following examples are given to illustrate the present invention in more detail. The values of water resistant pressure in the examples were measured according to the method (low pressure method) defined by JIS-L1092-1977A, and the values of pore diameter were obtained from the results of observation using an electron microscope and that of the measurement of pore size distribution made according to a mercury press-in method (using "Pore Sizer 9300," a product of Micromeritic Co.). Further, the values of durability are the results of measurement made after washing repeated fifty times according to the method defined by JIS-L1082-1972, and the values of peeling strength are the results of measurement made according to the method defined by JIS-L1066.

<Preparation of Polymer Solution 1>

100 parts of polytetramethylene ether glycol and 25 parts of 4,4'-diphenylmethane diisocyanate were reacted at 70° C. for 4 hours to obtain an isocyanate-terminated urethane prepolymer. This urethane prepolymer was dissolved in dimethylformamide (hereinafter referred to simply as "DMF"), γ-methyl-L-glutamate-N-carboxylic anhydride of the same amount as the prepolymer was added thereto and tributylamine was added as a catalyst. Reaction was allowed to take place at 30° C. for 2 hours to obtain a copolymer.

<Preparation of Polymer Solution 2>

128 parts of polyethylene adipate glycol, 40 parts of 4,4'-diphenylmethane diisocyanate and 170 parts of DMF were reacted at 70° C. for 1 hour to obtain a urethane prepolymer having an average molecular weight of 2,300.

A separately prepared solution consisting of 14 parts isophorone diamine and 560 parts DMF was added little by little into the above urethane prepolymer solution at room temperature under stirring.

250 parts of DMF and 1 part of tributylamine were added to 500 parts of the polyurethane resin solution just prepared above, then 45 parts of γ-methyl-L-glutamate-N-carboxylic anhydride was added at 30° C. under stirring and reaction was allowed to take place for 3 hours to obtain a copolymer.

<Preparation of Polymer Solution 3>

A diol-terminated polyester diol was obtained from 8 mols of ethylene glycol, 2 mols of polyethylene glycol, 4 mols of terephthalic acid and 1 mol of 5-sodium sulfoisophthalic acid, to which were then added hexamethyl diisocyanate and DMF, and reaction was allowed to proceed. As a result, there was obtained a polyurethane solution having SO$_3$Na group.

<Pretreatment for Base Fabric>

A dyed product of nylon 6 taffeta characterized by warp 70 denier, 12 filaments, weft 70 denier, 24 filaments, warp density 120 pc./inch and weft density 90 pc./inch, was immersed in a 10 g/l aqueous solution of a fluorine water repellent Asahiguard AG710 and squeezed at a mangle pressure of 2 kg/cm$^2$, then heat-treated at 180° C. for 2 minutes.

EXAMPLE 1

100 g/m$^2$ of the polymer solution 1 was applied to the pretreated base fabric, and after immersion in water at 30° C. for 5 minutes, the fabric was further immersed in a 1N aqueous solution of sodium hydroxide, then washed with water, dried and thereafter heat-treated by means of a tenter at 180° C. for 1 minute. The waterproof fabric thus obtained was found to have such properties as shown in Table 1.

EXAMPLE 2

A waterproof fabric was obtained in the same way as in Example 1 except that the heat treatment was performed for 10 seconds at a temperature of 140° C. and a pressure of 20 kg/cm$^2$ in place of the 180° C. 1 min. tenter heat treatment.

EXAMPLE 3

A waterproof fabric was obtained in the same way as in Example 1 except that a 3N aqueous hydrochloric acid solution was used in place of the 1N aqueous sodium hydroxide solution.

EXAMPLE 4

A waterproof fabric was obtained in the same way as in Example 1 except that the immersion in water at 30° C. was not performed.

COMPARATIVE EXAMPLE 1

A waterproof fabric was obtained in the same way as in Example 1 except that the immersion in the 1N aqueous sodium hydroxide solution was not performed.

EXAMPLE 5

A waterproof fabric was obtained in the same way as in Example 1 except that the polymer solution 2 was used in place of the polymer solution 1.

EXAMPLE 6

A waterproof fabric was obtained in the same way as in Example 4 except that the polymer solution 2 was used in place of the polymer solution 1.

EXAMPLE 7

15 parts of DMF having dissolved therein 3 parts of a 1N aqueous sodium hydroxide solution was dissolved in 100 parts of the polymer solution 2. After stirring for 5 minutes, the resulting solution was applied to the pretreated base fabric in an amount of 100 g/m². The thus-coated fabric was immersed in water at 30° C. for 5 minutes, then washed with water and dried. The dried fabric was subjected a tenter heat treatment at 180° C. for 1 minute to obtain a waterproof fabric.

COMPARATIVE EXAMPLE 2

A waterproof fabric was obtained in the same way as in Example 5 except that the immersion in the 1N aqueous sodium hydroxide solution was not performed.

COMPARATIVE EXAMPLE 3

The polymer solution 2 was applied to the pretreated base fabric in an amount of 100 g/m², followed by drying at 150° C. for 3 minutes to obtain a waterproof fabric.

EXAMPLE 8

150 g/m² of an ethylene dichloride solution containing 10 wt. % of poly-γ-methyl-L-glutamate was applied to the pretreated base fabric. After immersion in methanol at 30° C. for 5 minutes, the fabric was washed with water and then immersed in a 1N aqueous sodium hydroxide solution, followed by water-washing and drying. The dried fabric was subjected to a tenter heat treatment at 180° C. for 1 minute to obtain a waterproof fabric.

COMPARATIVE EXAMPLE 4

A waterproof fabric was obtained in the same way as in Example 8 except that the immersion into the 1N aqueous sodium hydroxide solution was not performed.

EXAMPLE 9

100 g/m² of the polymer solution 3 was applied to the pretreated base fabric, then the thus-coated fabric was immersed in water at 30° C. for 1 minute, then washed with water and dried. The dried fabric was immersed in an aqueous solution containing 40 g/l of Asahiguard AG-710, then squeezed at a mangle pressure of 2 kg/cm² and subjected to a tenter heat treatment at 180° C. for 1 minute to obtain a waterproof fabric.

EXAMPLE 10

100 g/m² of the polymer solution 3 was applied to the pretreated base fabric, followed by drying at 50° C. for 10 minutes. The dried fabric was immersed in an aqueous solution containing 40 g/l of Asahiguard AG-710, then squeezed at a mangle pressure of 2 kg/cm² and subjected to a tenter heat treatment at 180° C. for 1 minute to obtain a waterproof fabric.

EXAMPLE 11

100 g/m² of CRISVON 8006HV, a polyester type polyurethane, was applied to the pretreated base fabric. The thus-coated fabric was immersed in water at 30° C. for 1 minute, then washed with water and dried.

The dried fabric was immersed in an aqueous emulsion containing 2 mols of acrylic acid, 1 mol of methacrylic acid, 15 g of monochlorobenzene and 2 g of benzoyl peroxide, then squeezed at a mangle pressure of 2 kg/cm², heated with microwave to effect graft polymerization, washed with water, then immersed in a 1N aqueous sodium carbonate solution at 80° C. for 10 minutes, followed by water-washing and drying. Further, the dried fabric was immersed in an aqueous solution containing 40 g/l of Asahiguard AG-710, then squeezed at a mangle pressure of 2 kg/cm² and subjected to a tenter heat treatment at 180° C. for 1 minute to obtain a waterproof fabric.

COMPARATIVE EXAMPLE 7

A waterproof fabric was obtained in the same way as in Comparative Example 6 except that 20 wt. % of Sumikagel SP-520, a resin having a high water absorbability, was incorporated in the CRISVON 8006HV described in Comparative Example 6, to obtain a waterproof fabric.

Results of the above working examples and comparative examples are as shown in Table 1 below.

TABLE 1

|  | Polymer Solution | Film Forming and Modifying Conditions | Constituent Polymer and Hydrophilic End Group |
|---|---|---|---|
| Example 1 | Polymer Solution 1 | after wet coagulation, modification with NaOH | PAU, COONa |
| Example 2 | Polymer Solution 1 | after wet coagulation, modification with NaOH | PAU, COONa |
| Example 3 | Polymer Solution 1 | after wet coagulation, modification with HCl | PAU, COOH |
| Example 4 | Polymer Solution 1 | coagulation and modification in NaOH bath | PAU, COONa |
| Comparative | Polymer Solution 1 | only wet coagulation | PAU, — |

TABLE 1-continued

| | | | |
|---|---|---|---|
| Example 1 | | | |
| Example 5 | Polymer Solution 2 | after wet coagulation, modification with NaOH | PAU, COONa |
| Example 6 | Polymer Solution 2 | coagulation and modification in NaOH bath | PAU, COONa |
| Example 7 | Polymer Solution 2 + NaOH | only wet coagulation | PAU, COONa |
| Comparative Example 2 | Polymer Solution 2 | only wet coagulation | PAU, — |
| Comparative Example 3 | Polymer Solution 2 | 150° C., 3 min. dry film forming | PAU, — |
| Example 8 | PMLG | after coagulation with MeOH, modification with NaOH | PA, COONa |
| Comparative Example 4 | PMLG | only MeOH coagulation | PA, — |
| Example 9 | Polymer Solution 3 | only wet coagulation | PU, $SO_3Na$ |
| Example 10 | Polymer Solution 3 | 50° C., 10 min. dry film forming | PU, $SO_3Na$ |
| Example 11 | CRISVON 8006HV | after wet coagulation, graft modification | PU, COONa |
| Comparative Example 5 | Polymer Solution 3 | 150° C., 3 min. dry film forming | PU, $SO_3Na$ |
| Comparative Example 6 | CRISVON 8006HV | only wet coagulation | PU, — |
| Comparative Example 7 | CRISVON 8006HV + Sumikagel SP-520 | only wet coagulation | PU, (OH, COOH) |

| | Are three pores appreciable with electron microscope? | Average Pore Diameter (Å) | Moisture Permeability ($g/m^2 \cdot 24$ hr) | | | Water Registant Pressure $mmH_2O$ | Peeling Strength g/cm | Durability (Washing 50 times) |
|---|---|---|---|---|---|---|---|---|
| | | | $M_1$ | $M_2$ | $M_2 - M_1$ | | | |
| Example 1 | No | 80 | 7000 | 22000 | 15000 | 2000 | 850 | film all right |
| Example 2 | No | 80 | 7500 | 22000 | 14500 | 2000 | 900 | " |
| Example 3 | No | 100 | 6500 | 15000 | 8500 | 2000 | 800 | " |
| Example 4 | No | 70 | 6000 | 20000 | 14000 | 2000 | 850 | " |
| Comparative Example 1 | Yes | 1500 | 6000 | 8000 | 2000 | 800 | 250 | partial peeling |
| Example 5 | No | 80 | 5500 | 21000 | 15500 | 2000 | 750 | film all right |
| Example 6 | No | 70 | 5000 | 25000 | 20000 | 2000 | 800 | " |
| Example 7 | No | 800 | 7000 | 26000 | 19000 | 2000 | 550 | " |
| Comparative Example 2 | Yes | 1700 | 7000 | 9500 | 2500 | 1000 | 180 | partial peeling |
| Comparative Example 3 | No | 50 | 800 | 1000 | 200 | 2000 | 1000 | film all right |
| Example 8 | No | 150 | 6000 | 31000 | 25000 | 2000 | 1000 | " |
| Comparative Example 4 | Yes | 2000 | 6000 | 9000 | 3000 | 1500 | 500 | " |
| Example 9 | No | 780 | 6500 | 15500 | 9000 | 1800 | 450 | " |
| Example 10 | No | 120 | 4500 | 12000 | 7500 | 2000 | 1000 | " |
| Example 11 | No | 800 | 5000 | 16000 | 9000 | 1500 | 350 | " |
| Comparative Example 5 | No | 50 | 1200 | 2000 | 800 | 2000 | 1000 | " |
| Comparative Example 6 | Yes | 20000 | 4000 | 6000 | 2000 | 2000 | 250 | slight peeling |
| Comparative Example 7 | Yes | 15000 | 4500 | 8000 | 3500 | 1000 | 200 | Sumikagel dropped out |

In Table 1:
(Note 1)
PAU: polyamino acid urethane copolymer
PA: polyamino acid
PU: polyurethane
PMLG: poly-γ-methyl-L-glutamate
(Note 2)
The "pores appreciable with electron microscope" indicate pores which are appreciable when observed at a magnification of 4,000X through an electron microscope.

The following is a summary of effects of the present invention.

a. A high moisture permeability is attained because both insensible and sensible perspirations in clothes are allowed to permeate.

b. Water-absorptive swelling property permits an improvement of waterproofness, like the waterproofing mechanism of cotton canvas.

c. A high water resistance is attained because of extremely small pores as compared with conventional moisture-permeable waterproof fabrics.

d. Has both moisture absorbability and water absorbability.

e. Because the polymer coating is transparent, there is no feeling of coating and a superior fashionableness is attained.

f. It is possible to attain a higher moisture permeability than that in the case of a base fabric alone.

g. A high stainproofness is attained because dirt is not deposited in fine pores.

h. Texture is good.

i. Employable as a substitute for resins having a high water absorbing property which are used as articles for menses. There is no fear of backward flow because water is discharged to the exterior.

j. Suitable for dust-proof and dust-free clothes because of having moisture permeability in an ultramicroporous structure.

k. Employable as a water-pillow or a cooling bag because of the absorption of heat during permeation of liquid water.

l. Suitable for high-temperature working clothes, fire-fighting clothes and chemicals spraying clothes, for the same reason as the above k.

m. Suitable for heavy duty sportswears because of high peeling strength and superior durability.

n. Employable for aseptic clothes and wound coating materials because of preventing the permeation of bacteria and having moisture permeability.

BRIEF DESCRIPTION OF THE DRAWINGS

The drawings are all photographs showing shapes of fibers, in which.

What is claimed is:

1. A waterproof fabric having a high moisture permeability and having an ultra-microporous continuous polymer coating having an average pore diameter in the range of between 50 Å and 0.2μ, said polymer having a monomer unit containing at least one acid radical selected from carboxyl group, sulfonic acid group, and alkali metal salts thereof.

2. A waterproof fabric having a high moisture permeability as set forth in claim 1, wherein said polymer coating has an average pore diameter in the range of between 50 Å and 0.1μ.

3. A waterproof fabric having a high moisture permeability as set forth in claim 1, wherein said polymer coating has an average pore diameter in the range of between 80 Å and 0.05μ.

4. A waterproof fabric having a high moisture permeability as set forth in claim 1, wherein said polymer containing at least 5% by weight of said acid radical-containing monomer unit.

5. A waterproof fabric having a high moisture permeability as set forth in claim 1, wherein said polymer contains at least 9% by weight of said acid radical-containing monomer unit.

6. A waterproof fabric having a high moisture permeability as set forth in claim 1, wherein said acid radical-containing monomer unit is present in a homopolymerized, random-copolymerized, block-copolymerized or graft-copolymerized state.

7. A waterproof fabric having a high moisture permeability as set forth in claim 1, wherein said polymer is an elastomeric polymer.

8. A waterproof fabric having a high moisture permeability as set forth in claim 7, wherein said elastomeric polymer is polyurethane.

9. A waterproof fabric having a high moisture permeability as set forth in claim 1, wherein said acid radical-containing monomer unit has been derived from an olefinic unsaturated carboxylic acid, a sulfonic acid group-containing aromatic dicarboxylic acid, or an aliphatic aminoacid having not more than two carboxyl groups.

10. A waterproof fabric having a high moisture permeability as set forth in claim 1, wherein said polymer is a blend of a polymer having said acid radical-containing monomer unit and another polymer.

11. A waterproof fabric having a high moisture permeability as set forth in claim 10, wherein said blend comprises at least 30% by weight of a polymer having said acid radical-containing monomer unit and at most 70% by weight of another polymer.

12. A waterproof fabric having a high moisture permeability as set forth in claim 1, having a moisture permeability $M_1$ not lower than 4,000 g/m²·24 hr as measured according to the method defined by ASTM-E96-66B, and wherein the difference between a moisture permeability $M_2$ as measured according to the method defined by ASTM-E96-66BW and said $M_1$ is not smaller than 4,000 g/m²·24 hr.

13. A waterproof fabric having a high moisture permeability as set forth in claim 12, wherein the difference between $M_2$ and $M_1$ is not smaller than 8,000 g/m²·24 hr.

14. A method of making a waterproof fabric having a high moisture permeability and having thereon an ultra-microporous continuous polymer coating, said polymer coating container an acid radical-containing monomer unit or an alkali metal salt thereof and having an average pore diameter in the range of between 50 Å and 0.2μ, said method comprising:
 (a) applying to a fabric a solution of a polymer which does not contain an acid group,
 (b) forming a coating of said polymer on said fabric by a dry, a wet or a dry-wet coagulation process,
 (c) graft copolymerizing said polymer with a graft-polymerizable carboxylic acid or sulfonic acid compound, or an ester of either compound, and
 (d) treating said graft copolymer with an acid or an alkali solution, if necessary to provide the acid radical monomer unit or the alkali metal salt thereof.

15. A method of making a waterproof fabric having a high moisture permeability and having thereon an ultra-microporous continuous polymer coating, said polymer coating containing an acid radical-containing monomer unit or an alkali metal salt thererof and having an average pore diameter in the range of between 50 Å and 0.2μ, said method comprising:
 (a) applying to a fabric a solution of a polymer prepared from a monomer containing a carboxylic acid group, a sulfonic acid group or an alkali metal salt of either,
 (b) forming a coating of said polymer on said fabric by a dry, a wet or a dry-wet coagulation process, and
 (c) treating said polymer with an alkali or an acid solution, if necessary to provide the acid radical monomer unit or the alkali metal salt thereof.

16. A method of making a waterproof fabric having a high moisture permeability and having thereon an ultra-microporous continuous polymer coating, said polymer coating containing an acid radical-containing monomer unit or an alkali metal salt thereof and having an average pore diameter in the range of between 50 Å and 0.2μ, said method comprising:

(a) applying to a fabric a solution of a polymer prepared from a monomer containing a carboxylic acid ester group or a sulfonic acid ester group, (b) forming a coating of said polymer on said fabric by a dry, a wet or a dry-wet coagulation process, and (c) treating said polymer with an acid or an alkali solution during or after the coagulation to provide the acid radical monomer unit or the alkali metal salt thereof.

17. A method as set forth in claim 16, wherein the polymer having a sulfonic acid ester group-containing monomer unit is either a copolymer obtained by a condensation polymerization of a γ-alkyl glutamate-N-carboxylic anhydride and an isocyanate end group-containing prepolymer, or a homopolymer of γ-alkyl glutamate.

18. A method as set forth in claim 15, the polymer having a sulfonic acid group-containing monomer unit is a copolymer obtained by a condensation polymerization of a polyester diol prepolymer and a diisocyanate compound, said polyester diol prepolymer being obtained from sulfoisophthalic acid and diol.

19. A method as set forth in claims 14, 15, 16 wherein said polymer contains at least 5% by weight of said acid radical-containing monomer unit.

20. A method as set forth in claims 14, 15, 16 wherein said polymer contains at least 9% by weight of said acid radical-containing monomer unit.

21. A method as set forth in claims 14, 15, 16 wherein said polymer is a blend of a polymer having said acid radical-containing monomer unit and another polymer.

22. A method as set forth in claim 21, wherein said blend comprises at least 30% by weight of the polymer having said acid radical-containing monomer unit and at most 70% by weight of said another polymer.

* * * * *